United States Patent Office 2,767,419
Patented Oct. 23, 1956

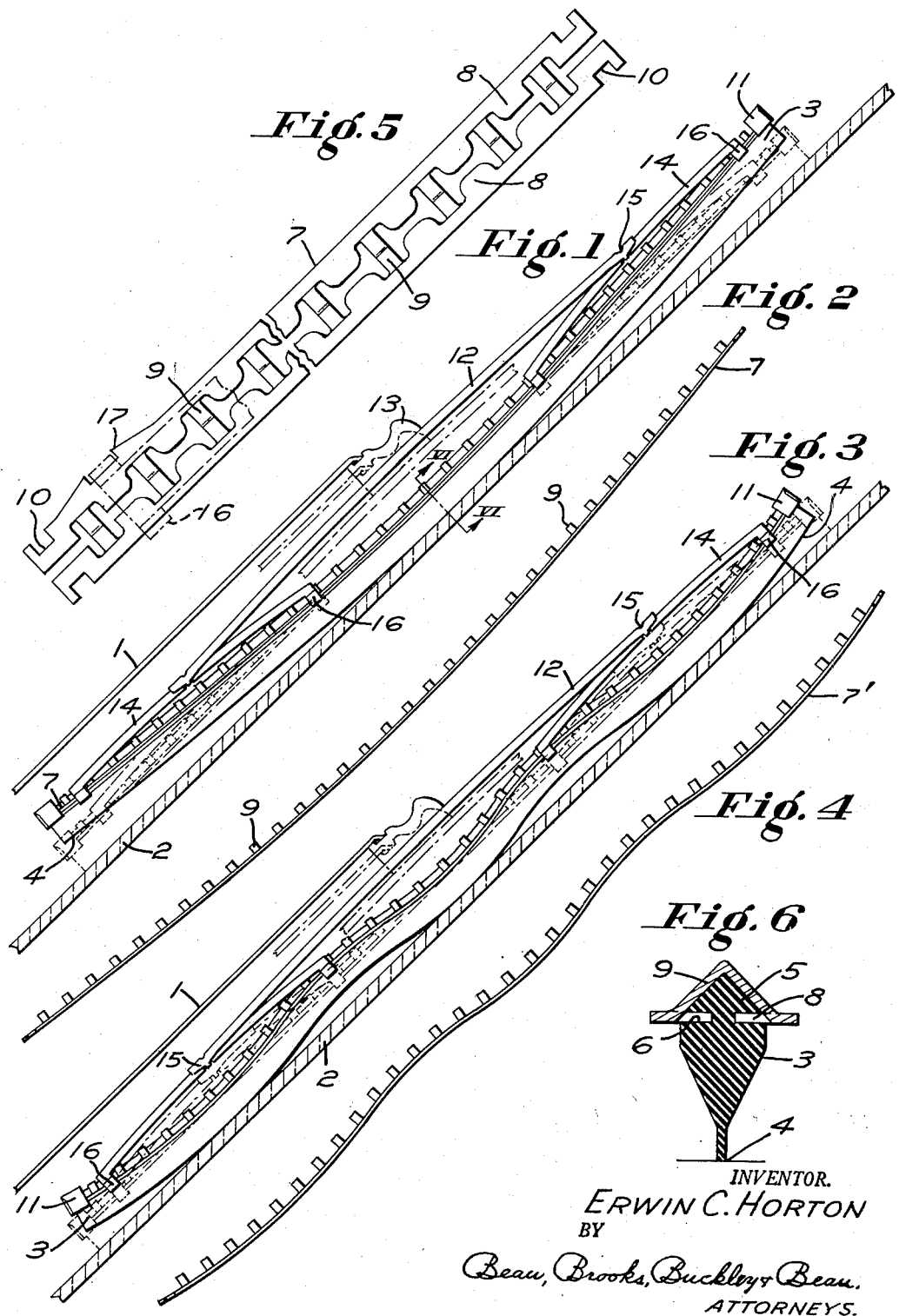

2,767,419

WINDSHIELD WIPER BLADE

Erwin C. Horton, Hamburg, N. Y., assignor to Trico Products Corporation, Buffalo, N. Y.

Application December 17, 1952, Serial No. 326,511

5 Claims. (Cl. 15—245)

This invention relates generally to the window cleaning art, and more particularly to an improved windshield wiper blade of the type utilizing one or more floating or span portions.

Wiper blades intended for use on curved window glass commonly utilize a flexible resilient backing with a pressure-distributing holder member attached to the blade body or to the backing at spaced points therealong to enable the blade to flex intermediate said spaced points in a direction normal to the window glass and thus conform to the curvature of the glass. Some prior art constructions have also provided the blade with an initial bias resulting in a generally concave squeegee formation relative to the pressure-distributing holder member.

However, such wiper blades frequently must also function on a substantially flat surface, either when used in connection with window glass having both curved and relatively flat portions or when used on a substantially flat windshield. In prior art wiper blades utilizing one or more resilient spans intermediate the points of attachment to the holder member, with the resilient spans normally either straight or concave relative to the holder member, there is no way of applying wiping pressure in the portion of the blade span intermediate such points of attachment or pressure application unless the wiping lip is formed over under such points of pressure application. Only by bringing these points closer to the glass can pressure be applied through the flexible backing out in the intermediate span or spans. Thus, when the blade first contacts a substantially flat window surface, blade pressure is applied against the window surface only at or beneath the points of connection to the pressure-distributing holder member, which are the points of pressure application, and the remaining portion of the blade will not bear against the window surface with sufficient pressure to enable the blade to perform its wiping function. This obviously is undesirable in that either the intermediate span portions of the blade do not fully wipe the window surface, or the blade portions immediately beneath the points of pressure application are severely distorted, the pressure distribution throughout the blade being extremely uneven in either case. This problem is accentuated when the blade initially of concave formation relative to its holder member.

Of course, this problem is not limited to blades adapted for use on curved glass, but is found in any blade wherein the squeegee comprises one or more floating span portions.

Accordingly, it is a primary object of this invention to provide a wiper blade adapted for use on both curved and flat windshields and which will have a much more even distribution of wiping pressure throughout its length.

A further object of this invention is to provide a wiper blade of span construction wherein the span portion or portions intermediate the points of attachment to the pressure-distributing holder member will first contact the window glass to provide a substantially uniform pressure distribution throughout the blade as the points of attachment are advanced to the window surface.

Another object of this invention is to provide a wiper blade utilizing one or more floating span sections and embodying flexible resilient backing means formed with a bias tending advance the center portion of the span section or sections toward the window surface.

In addition, it is an object of this invention to provide a wiper blade utilizing spaced points of support on the superstructure and a flexible resilient backing for the wiper element formed with an initial bias to provide a wiper element of convex formation relative to the superstructure intermediate said points of support.

It is also an object of this invention to provide a wiper blade as aforesaid which is relatively simple in construction and inexpensive to manufacture, and which is efficient and durable in operation.

The foregoing and other objects will become apparent upon a perusal of the ensuing detailed description taken together with the accompanying drawing forming a part thereof and wherein:

Fig. 1 is a view in side elevation showing a wiper blade with its position as it first makes contact with the window glass being shown in solid lines and its full operative position on the glass being shown in broken lines;

Fig. 2 is a view in side elevation of the flexible resilient backing used in the blade of Fig. 1;

Fig. 3 shows a view in side elevation of a preferred form of wiper blade embodying this invention, with its position as it first makes contact with the window surface being shown in solid lines and its full operative position on the window surface being shown in broken lines;

Fig. 4 is a view in side elevation of the flexible resilient backing used in the blade of Fig. 3;

Fig. 5 is a plan view of the flexible backing used in the blades of Figs. 1 and 3, with parts broken away for ease of illustration; and, Fig. 6 is a sectional view along line VI—VI of Fig. 1.

Referring now to the drawings, there is shown a conventional wiper carrying or actuating arm 1 spring biased in a conventional manner (not shown) to urge said arm toward windshield 2, and the wiper blade of the instant invention is carried at the outer end of said arm in a conventional manner.

The wiper blade, as shown in Fig. 1, comprises an elongated rubber blade body or squeegee 3 provided with a wiping edge 4 along one longitudinal margin thereof, and a triangular portion 5 extending along the opposite longitudinal margin thereof, said portion 5 being undercut on opposite sides thereof, as at 6, whereby to accommodate the flexible backing 7.

The flexible backing 7 comprises an elongated strip of spring metal cut out along its central portion to alternately provide opposed inwardly extending flanges or shoulders 8 and upwardly indented triangular bridge portions 9. Said backing strip 7 is fitted to blade body 3 with flanges 8 engaging the undercut portion 6 thereof and with bridge elements 9 extending around the triangular portion 5 of said blade, whereby said backing strip securely embraces portion 5 to provide a flexible and resilient backing for said blade body and its wiping edge. The strip 7 is assembled on blade body 3 by sliding said backing strip along said blade body, and backing strip 7 is notched adjacent opposite ends thereof, as at 10, with bumper members 11 engaging the opposite ends of said backing strip and said notches 10, as well as around the opposite ends of portion 5 of the blade body, whereby to maintain said blade body and backing strip in assembled relation.

The holder or support member for the blade comprises a pressure-distributing superstructure consisting of a primary yoke or bridge element 12 provided intermediate its ends with a wiper arm attaching clip 13 of known construction, and connected to the blade body through secondary yokes or bridges 14 pivoted intermediate their ends to the opposite ends of yoke 12, as at 15. Clip 13 serves to attach the blade to the outer end of arm 1.

Claw extensions 16 are provided at opposite ends of said secondary yokes 14, which claw extensions engage around backing strip 7 at opposite sides thereof, whereby to provide spaced points of attachment to the blade body. To limit relative longitudinal movement between the blade body and its supporting superstructure, backing strip 7 is provided adjacent one of said claw extensions with a laterally enlarged notched portion 17, shown in Fig. 5, the backing strip and blade body being freely movable longitudinally with respect to the remainder of said claw extensions to accommodate flexing of the blade.

In this way, the wiper blade comprises a blade body having multiple span or floating sections intermediate the points of attachment to the supporting superstructure, and with this arrangement, including the rockable secondary yoke elements, the blade will readily conform to a curved window surface. However, for purposes of the instant invention secondary yokes 14 may be dispensed with, if desired, with primary yoke 12 being directly connected to strip 7 or body 3 to provide a blade body having a single span or floating section.

In accordance with the instant invention, instead of utilizing a straight backing strip or one formed to provide a concave body formation, with the aforesaid attendant disadvantages, strip 7 is formed with an initial bias whereby the same is curved outwardly toward the window surface and assumes a convex shape with relation to the supporting superstructure of the blade. Thus, as shown in Figs. 1 and 2 which are somewhat exaggerated to more clearly illustrate the device and wherein the blade body can be considered as a single span suspended from the opposed outer ends of secondary bridges 14, it will be seen that backing strip 7 is initially formed to assume a convex outline with relation to the supporting superstructure, thus causing blade body 3 to assume this initial convex bias advancing its intermediate portion outwardly toward the window surface as soon as said blade body and backing strip are assembled, as indicated by the full line showing in Fig. 1. With this initial bias causing the blade body to assume a convex shape, it will be observed from the full line showing of Fig. 1 that the floating intermediate portion of body 3 first contacts the surface of window 2, and that as the blade is urged further toward said window by arm 1, the arched intermediate portion of body 3 and strip 7 yield to permit the wiping edge portions beneath the points of attachment to the supporting superstructure, comprising the points of direct pressure application, to come down into contact with the glass, as indicated by the broken line showing in Fig. 1 which shows the wiper blade in full operative position on the window surface. The resilient backing maintains wiping pressure on the intermediate wiping edge portions, and by means of this initially outwardly biased construction of the blade body the portions thereof beneath the points of direct pressure application are not overloaded and a substantially uniform pressure distribution will prevail throughout the length of the blade body; certainly a far more uniform pressure distribution than is the case in prior art constructions such as those previously referred to.

As a preferred embodiment particularly applicable wherein a multiple span construction is utilized, the backing strip can be formed with an initial bias providing a convex blade body outline relative to the superstructure intermediate each point of direct pressure application. Thus, as shown in Figs. 3 and 4, which are also somewhat exaggerated to clearly illustrate the invention, the blade body can be considered to have four points of direct pressure application defined by the opposite ends of the secondary yokes with three floating or span body sections therebetween, and strip 7 is formed to cause each of said span sections to assume a convex shape extending toward the window surface intermediate said points of direct pressure application. To accomplish this, the flexible backing strip 7 is formed as shown at 7' in Fig. 4, and the blade body 4 will automatically assume this shape when the backing strip is assembled thereon. Here again it will be observed from the full line showing in Fig. 3 that the arched span portions first contact the window glass intermediate their ends, with the points of direct pressure application remaining out in the air, so to speak, and upon further urging by arm 1 the resilient backing will yield and the wiping edge portions beneath said points of direct pressure application will be brought into contact with the window glass to cause the blade to assume the full operative position illustrated by the brokenline showing in Fig. 3, whereby a substantially uniform pressure distribution is achieved throughout the entire length of the blade body.

From the foregoing it will be seen that the resilient backing member formed to give the spring-supported span a bias to present its wiping edge portions in wiping contact with the windshield while the wiping edge portions at the points of pressure application are still out of contact with the glass, the pressure application throughout the spring-supported span portions will add up to the pressure required to bring the portions at the points of pressure application into wiping contact with the glass, and that under the final operating conditions the pressure on the wiping portions in line with the points of pressure application will be only the difference between the amount of this pressure application and the amount of pressure distributed over the spring-supported span by its resilient backing member as needed to flex such span portion into position for a wiping contour conformance of the wiping lip with the surface of the shield in contact therewith.

Accordingly, it is seen that the instant invention fully accomplishes the aforesaid objects, and provides a wiper blade of span or floating section construction wherein substantially uniform pressure distribution is achieved throughout the length of the blade body, thus providing a more uniform and satisfactory wiping action. At the same time, the blade is relatively simple in construction and relatively inexpensive to manufacture. For example, in prior art constructions using a straight backing strip, it has been found that the backing often has a tendency to assume a concave shape with relation to the supporting superstructure thus necessitating a considerable number of rejects in the manufacturing operation. However, in forming the backing strip with a convex outline, this manufacturing difficulty with its attendant expense is obviated, whereby the additional striking operation does not greatly increase the overall cost of manufacture. Also, particularly where a three span convex backing strip is provided, the overall outline of the backing strip, which previously had to be made within relatively close tolerances, becomes considerably less critical because the intermediate convex portions cause the backing strip to perform its intended function despite greater variation in the overall general outline thereof.

Obviously the instant invention is not limited to the particular detailed structure disclosed herein, but is capable of assuming other forms without departing from the inventive concept. Accordingly, it is intended that this invention be limited solely by the scope of the appended claims.

Having fully disclosed this invention, and completely described its mode of operation, what is claimed as new is as follows:

1. A wiper comprising, elongated blade body means having a wiping edge along one longitudinal margin, resilient backing means for said blade body means, said backing means being formed with an alternating concave and convex curvature therealong to resiliently bias said blade body means outwardly from one side thereof intermediate spaced points therealong, a supporting holder structure on the other side of said blade body means, and means securing said holder structure to one of said means adjacent said spaced points.

2. A wiper blade comprising, an elongated blade body, holder means supporting said blade body at spaced points to provide a number of blade body span portions therealong a resilient backing for said blade body, said backing being formed with alternating concave and convex curvatures to impart an individual convex outline to said blade body span portions, and means adjacent one of said spaced points of support permitting only limited relative longitudinal movement between said blade body and said holder means at said one point, said blade body being longitudinally movable relative to said holder means at the remainder of said spaced points of engagement.

3. A windshield wiper blade comprising, elongated blade body means having a wiping lip along one longitudinal margin, a resilient backing means secured to said blade body means to accept surface conformance of said wiping lip thereof and to impart lateral rigidity thereto, spaced bridge members secured to one of said means at points adjacent the opposite ends thereof, and a spanning bridge member secured adjacent its opposite ends to said spaced bridge members, said backing being pre-formed of concave and convex curvature alternating lengthwise thereof to impart a convex curvature to said wiping lip intermediate said points of securement to said spaced bridge members.

4. A wiper blade comprising, an elongated blade body, resilient backing means for said blade body, and pressure-distributing holder means embodying wiper arm attaching clip means secured to said backing means at spaced points along said blade body, said backing means being formed to assume alternating convex and concave curvatures lengthwise thereof urging the portions of said blade body intermediate said spaced points outwardly from said holder means and thus tending to advance the normal position of said intermediate body portions relative to the portions of said blade body adjacent said spaced points.

5. A windshield wiper blade comprising, an elongated blade body having a wiping edge along one longitudinal margin and a triangular undercut portion along the opposite longitudinal margin thereof, a flexible backing for said blade body comprising a strip of resilient material alternately provided centrally thereof with opposed inwardly extending shoulders and arched bridge portions embracing said triangular undercut blade body portion, and holder means engaging said backing at spaced points therealong, said backing being pre-formed with alternating concave and convex curvatures to impart an outwardly bowed outline to said blade body relative to said holder means intermediate said spaced points.

References Cited in the file of this patent

UNITED STATES PATENTS

| 2,596,063 | Anderson | May 6, 1952 |
| 2,687,544 | Scinta | Aug. 31, 1954 |

FOREIGN PATENTS

| 487,846 | Canada | Nov. 4, 1952 |